Sept. 3, 1968           R. RACCA           3,399,851
VIBRATION ISOLATOR UNIT
Filed Aug. 10, 1966
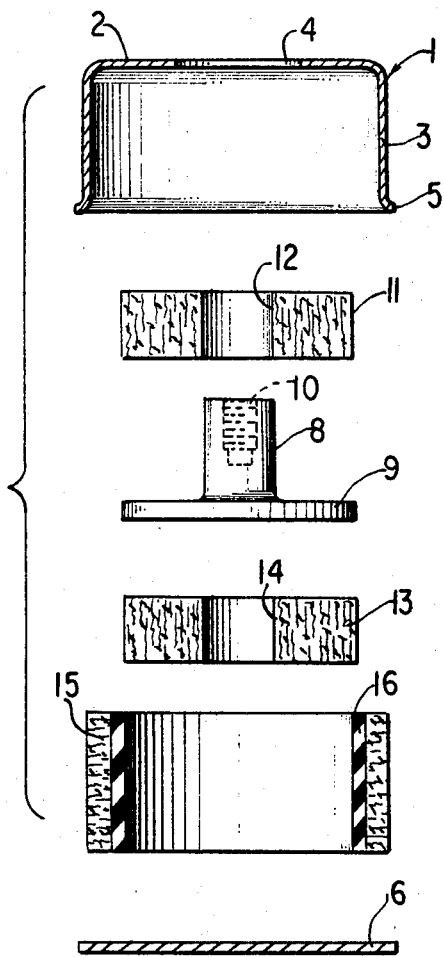
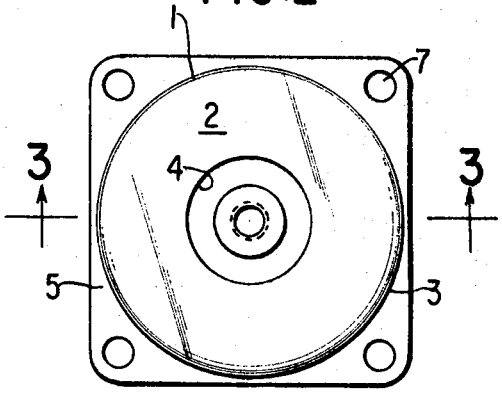
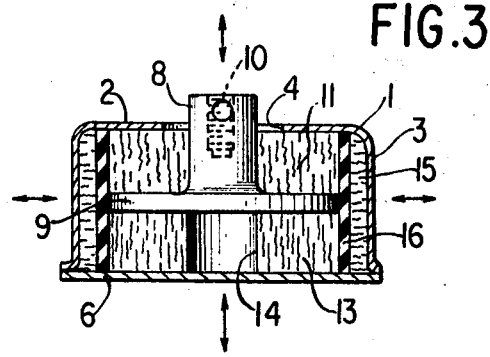
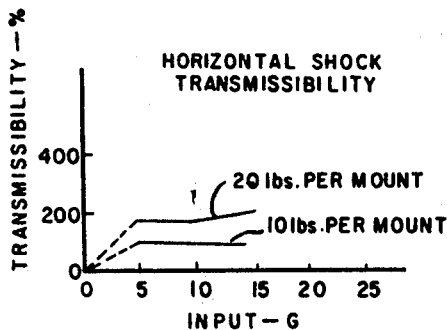
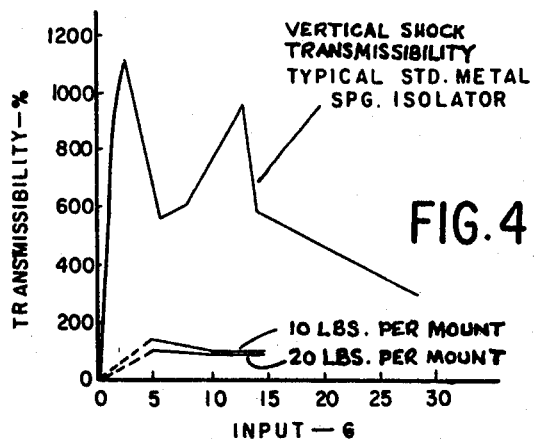
INVENTOR
ROMOLO RACCA
BY
     *Smythe & Moore*
         ATTORNEYS

United States Patent Office 3,399,851
Patented Sept. 3, 1968

3,399,851
VIBRATION ISOLATOR UNIT
Romolo Racca, Cheshire, Conn., assignor to Nichols Engineering Incorporated, Shelton, Conn., a corporation of Connecticut
Filed Aug. 10, 1966, Ser. No. 571,638
2 Claims. (Cl. 248—22)

ABSTRACT OF THE DISCLOSURE

A shock and vibration isolator unit having both vertical and horizontal shock transmisssibility and including a cupshaped housing mounted on a base plate. Sleeves of urethane material are arranged within the housing and engage with a disc-shaped head on a load-supporting stud. Discs of urethane material are also positioned within the housing on opposing sides of the stud head so that the sleeves and discs absorb shocks from the stud.

---

The present invention relates to mounts or supports for absorbing vibrations, and more particularly to a shock and vibration isolator unit which has a small size but which effectively protects against shock impulses as well as vibration.

Many forms of mounts or supports have been devised in order to prevent harmful vibrations or shocks from reaching the structures to be protected. While specific shock impulses or vibrations can readily be neutralized when a large amount of space is available, the limitations of space present in relatively small self-contained unit mounts make it extremely difficult to obtain a sufficient degree of absorption of vibrations together with the ability to cushion against occasional shock impulses of greater force. Such space limitations are present in aircraft electronic equipment. The space available for such vibration absorbing mounts or supports is very small and precisely defined within certain maximum limits. A series of isolator units has been developed for use in mounting such aircraft equipment. Such isolators are successful in protecting against vibrations; however, these isolators aggravate shock conditions and occasionally amplify even small shock impulses as much as 1000 percent. It is believed that known shock and vibration isolator units have not been successful because the resilient elements used therein could not make efficient use of the limited space available inside the isolator body.

One of the objects of the present invention is to provide an improved shock and vibration isolator unit that occupies a minimum of space.

Another of the objects of the invention is to increase the volumetric efficiency of a shock and vibration isolator unit having resilient material therein.

In one aspect of the invention, the vibration and shock isolator unit essentially comprises a base plate for mounting on a supporting structure and a cup-shaped housing mounted on the base plate to form a closed space. A cylindrical sleeve of a resilient material is positioned within the housing adjacent its cylindrical side wall. A load supporting stud projects from an opening in the top of the housing and has a disc-shaped head within the housing with the peripheral edge of the head slidably engaging the cylindrical sleeve of resilient material. Discs of resilient material are disposed in the faces between the stud head and top of the housing and the stud head and base plate. In order to fully utilize the volume within the isolator housing so as to provide more energy absorbing qualities, the resilient material comprises microcellular urethane. This elastomeric material has the characteristic of anomalous elasticity which provides superior protection as is apparent to those skilled in the art.

The cylindrical sleeve may comprise inner and outer sleeves which may be bonded together, and the inner sleeve may comprise a hard urethane material. The discs of resilient material within the housing may have central openings therethrough, with the stud passing through the opening in the disc positioned between the stud head and top face of the housing.

Other objects, advantages and features of the invention will be apparent from the following description and drawings which are merely exemplary.

In the drawings:

FIG. 1 is an exploded view in section of the components of the isolator unit of the invention;

FIG. 2 is a top plan view of the isolator unit of FIG. 1;

FIG. 3 is a sectional view taken along the line 3—3 of FIG. 2; and

FIGS. 4 and 5 are graphs illustrating the vertical shock transmissability and horizontal shock transmissibility, respectively, of the isolator structure of the invention.

Proceeding next to the drawings wherein like reference symbols indicate the same parts throughout the various views, a specific embodiment and modifications of the present invention will be described in detail.

Referring to FIG. 1, the isolator unit of the present invention comprises a cup-shaped housing 1 having a top surface 2 and a cylindircal wall 3. There is a central opening 4 in the top surface. The lower edges of the cylindrical wall 3 may be slightly flared outwardly as shown at 5 to facilitate fastening of the housing to a base plate 6. The base plate 6 is substantially square, as may be seen in FIG. 2, and has a plurality of holes 7 therein for mounting to a supporting structure. For the particular application of mounting electronic equipment in aircraft, the dimensions of the base plate may vary from 1¾₁₆ inches to 3 inches along one of its sides, depending upon the desired load rating of the mount.

Within the housing 1, there is slidably disposed a stud 8 which has a flat, disc-shaped head 9 attached to one end thereof. The stud 8 protrudes from housing opening 4 and has a tapped hole 10 therein for attachment to the load or supported structure.

Interposed between the stud head 9 and the top 2 of the housing is a disc-like resilient element 11 which has a central opening 12 therethrough. A similar resilient element 13 having a central opening 14 therethrough is positioned between the stud head 9 and the base plate 6. Both of the resilient elements are formed from a microcellular urethane with the density of the urethane depending upon the load carrying requirements of the particular isolator unit. The results of this invention can be achieved by employing open cell urethane having densities varying from 5 to 25 pounds per cubic foot.

The resilient elements 11 and 13 provide shock and vibration isolation in the vertical direction which is the principal loading direction of the isolator. In the horizontal direction, shock and vibration isolation is provided by an annuar ring 15 of micro-cellular urethane. In order to transfer the loads from the peripheral edge of the stud head 9 to the urethane ring 15 in such a manner that the full area of the ring 15 is effectively utilized, a urethane sleeve 16 is interposed between the peripheral edge of stud head 9 and the ring 15. The sleeve 16 is formed of a hard urethane material which has good wear characteristics, a low coefficient of friction and good ability to transfer the loads involved. The sleeve 16 is free to slide horizontally with respect to housing 1 and base plate 6 so as to efficiently transfer the load from the stud 8 to annular ring 15.

The stud 8 and resilient elements 11 and 13 are free to slide with respect to the sleeve 16 in the vertical direction. Accordingly, the sleeve 16 does not interfere in any way with the vertical shock or vibration characteristics of the isolator.

The isolator of the present invention is particularly characterized by its excellent stability under static loads. Previously known elastomeric isolator units exhibited the property of having a natural frequency higher than that predicted by the static load-deflection characteristics of the particular isolator. In order to archieve a specific natural frequency, it was necessary to provide isolators that had a lower static stiffness than that given by the classic singular degree of freedom formula:

$$K = \frac{(\omega_n)^2 (W)}{g}$$

Such isolating units had large deflections under static loads which were often of the order of magnitude of over twice that necessary according to classic theory. The result was an unstable mounting or supporting system.

In the present invention, the dynamic stiffness is some 40 to 50 percent less than the static stiffness. Thus, the isolator unit of the present invention has the opposite characteristic of previously known elastomeric isolator units. The resulting low natural frequencies are obtained with lower static deflections than those predicted by classic theory to result in a very stable mounting system, statically, when employing the isolator unit of the present invention.

It will be apparent that the dynamic characteristics of of the isolator unit can be varied over a wide range by changing the density and the cell size of the urethane resilient material.

Thus, is can be seen that the invention provides an improved shock and vibration isolator unit wherein a major portion of the volume available within the isolator housing is effectively utilized by the resilient elements. This effective use of the housing volume together with the excellent shock isolating properties of micro-cellular urethane result in an isolator unit of considerably superior performance in protecting delicate electronic components mounted in aircraft from the damaging effects of shock and vibration. It will be apparent that while the present isolator unit is particularly well adapted for the mounting of electronic components, numerous other applications of this isolator unit in neutralizing shock and vibrations can be readily appreciated.

Examples of suitable polyurethanes are as follows:

| Physical properties | Compound designation | | |
|---|---|---|---|
| | 1 | 2 | 3 |
| Shore durometer hardness | 92A | 50D | 75D |
| 100% modulus, p.s.i. | 1,100 | 1,800 | 3,500 |
| Tensile strength, p.s.i. | 5,000 | 8,800 | 7,500 |
| Elongation at break, percent | 450 | 420 | 250 |
| Specific gravity | 1.10 | 1.135 | 1.20 |
| Thermal conductivity, B.t.u./(hr.)(sq. ft.) (° F./in.) | 0.917 | 0.862 | 0.754 |
| Tear strength, split, p.l.i. | 70 | 155 | 175 |

The foregoing properties are for solid urethane. The solid urethane polymer is combined with a blowing agent to produce the foam. The blowing agent is inert as far as the urethane is concerned but the physical properties are lower than for the solid foam material. The preferred urethane is that sold under the trademark "Adiprene" by E. I. du Pont de Nemours and Co.

Chemically, urethanes are polymers resulting from the fundamental reaction, basic to all urethane chemistry, which involves the reaction of an isocyanate group with a compound containing an active hydrogen. While the name "urethane" is derived from the above mentioned reaction, other names, notably "polyurethane," have been applied to these polymers.

Since the isocyanate group will react with several different types of hydrogen-bearing compounds, there are a number of reactions which may take place during the preparation of urethane polymers. These reactions may be characterized as follows:

(1) Reaction of isocyanate and OH groups (urethane or carbamate linkage)

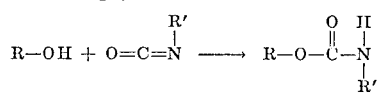

(2) Reaction of urethane group with isocyanate (allophonate reaction)

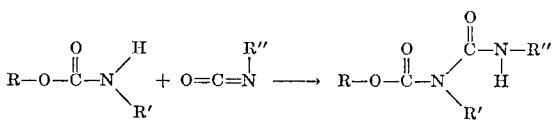

(3) Reaction of isocyanate with $H_2O$

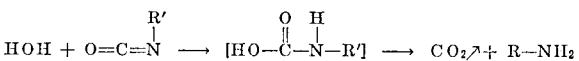

(4) Reaction of amines with isocyanates.

(5) Reaction of ureas with isocyanates (biuret)

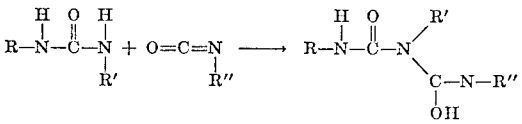

It is to be understood that changes can be made in the various details of construction and arrangement of parts without departing from the spirit of the invention, except as defined in the appended claims.

What is claimed is:

1. A vibration isolator unit comprising a base plate for mounting on a supporting structure, a cup-shaped housing having top and side faces mounted on said base plate, there being a central opening in said housing top face, an outer cylindrical sleeve of micro-cellular urethane material sleeved within said housing adjacent the side face thereof, and an inner cylindrical sleeve of hard urethane material sleeved within said outer sleeve, a load supporting stud protruding through said housing opening and having a disc-shaped head at one end thereof within said housing with the peripheral edge thereof slidably engagaing said inner cylindrical sleeve, and discs of micro-cellular urethane material within said housing between said disc-shaped stud head and said base plate and between said stud head and said housing top face, said discs having central openings therethrough whereby said stud passes through the opening in one of said discs, and said discs abutting said stud head, housing, top, base plate and the inner side of said inner sleeve whereby the movement of said stud head will be stabilized relative to said sleeves and discs and will move vertically relative thereto and thereby have vertical and horizontal shock transmissibility.

2. A vibrator isolator unit as claimed in claim 1 wherein the inner and outer sleeves are bonded together.

References Cited

UNITED STATES PATENTS

| | | | |
|---|---|---|---|
| 1,243,358 | 10/1917 | Stoddard | 248—22 XR |
| 2,256,752 | 9/1941 | Saurer | 248—22 |
| 2,359,942 | 10/1944 | Rosenzweig | 248—358XR |
| 2,641,426 | 6/1953 | Rauscher | 248—22 |
| 3,131,416 | 5/1964 | Milliken | 248—22 XR |

FOREIGN PATENTS 475,461  11/1937  Great Britain.

ROY D. FRAZIER, *Primary Examiner.*

R. S. SEITTER, *Assistant Examiner.*